May 31, 1966  F. V. McCAY, JR  3,253,614
HYDRAULIC CONTROL SYSTEM
Filed Feb. 28, 1964  3 Sheets-Sheet 1
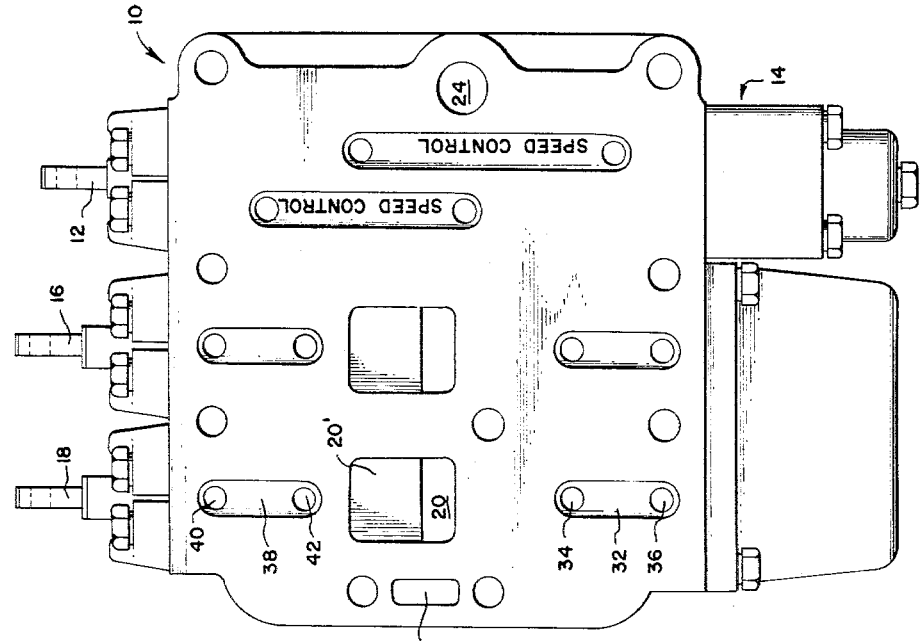
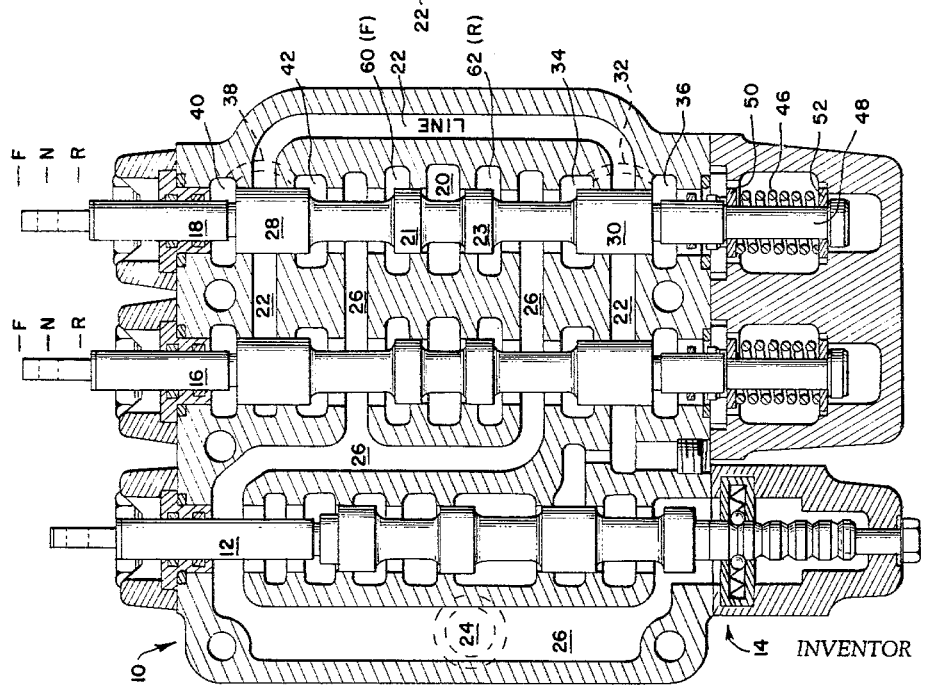
INVENTOR
Frank V. McCay, Jr.
BY Stowell + Stowell
ATTORNEYS

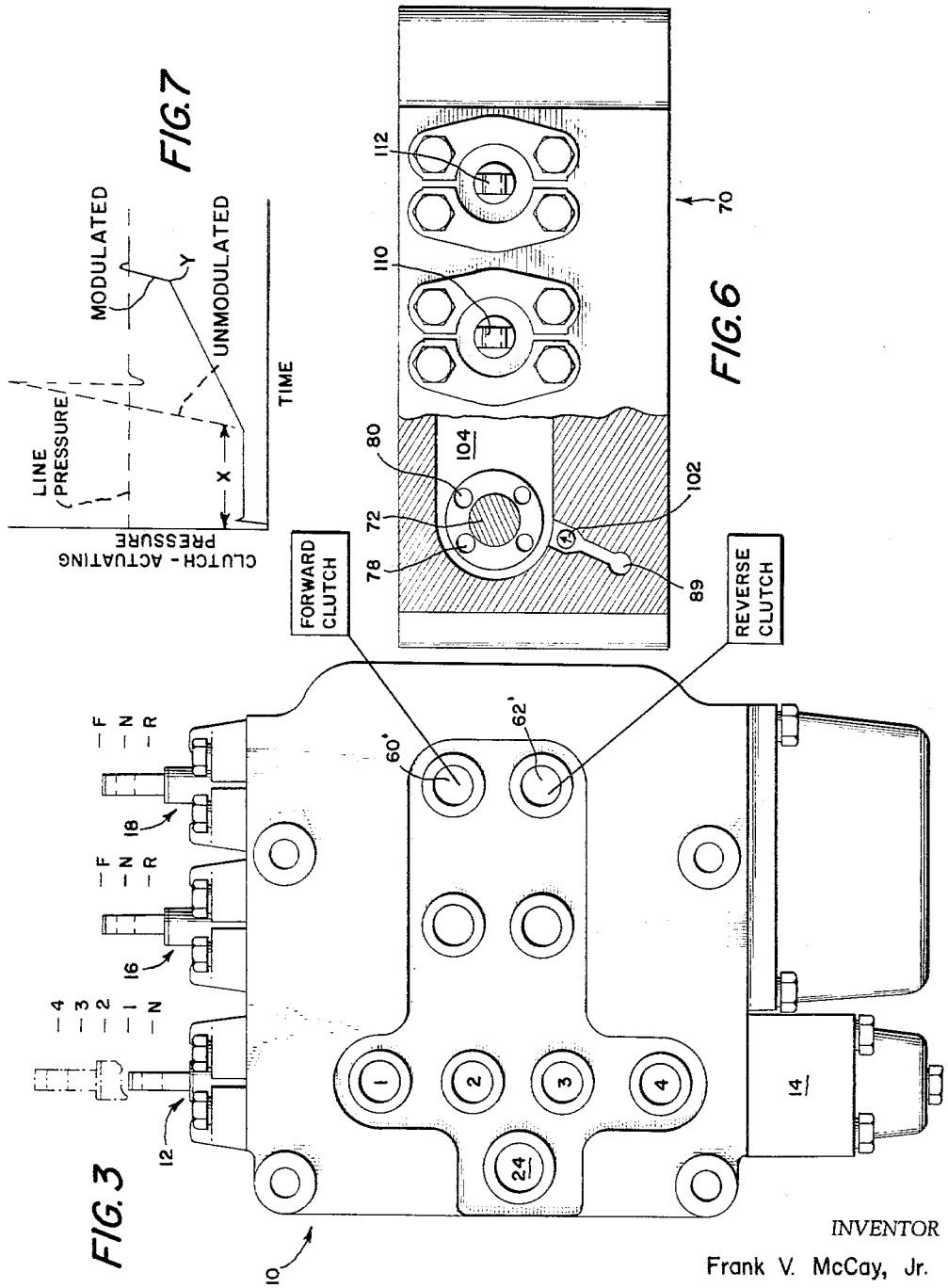

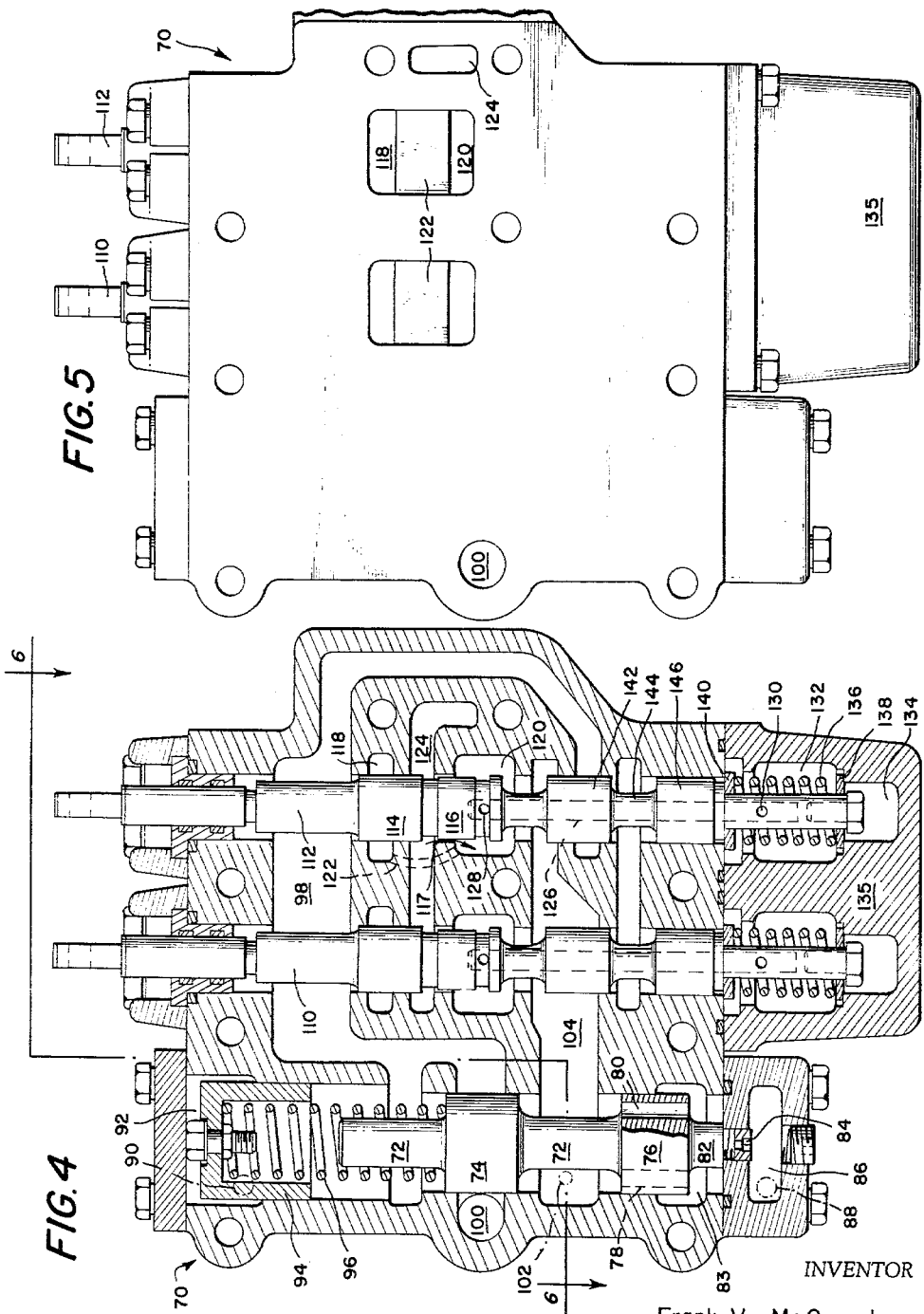

United States Patent Office 3,253,614
Patented May 31, 1966

3,253,614
HYDRAULIC CONTROL SYSTEM
Frank V. McCay, Jr., Salt Lake City, Utah, assignor to The Eimco Corporation, Salt Lake City, Utah, a corporation of Delaware
Filed Feb. 28, 1964, Ser. No. 348,044
11 Claims. (Cl. 137—596)

This invention relates to a hydraulic control system of the type which includes a plurality of spool valves, each of which controls one or a plurality of hydraulic mechanisms. An example of the application of the present invention is to be found on an earth-moving tractor or the like wherein there are a plurality of either hydraulic motors or hydraulically-actuated clutches. More specifically, the present invention exhibits particularly utility in modulating the action of hydraulically-actuated clutches whenever the operator of the vehicle or other hydraulic device requires a change in direction with a consequent requirement for the engagement of one or more hydraulically-actuated clutches.

According to one aspect of the present invention, a modulator means in the form of a spool is provided in a spool-type valve arrangement which is adapted to be coupled in parallel to hydraulically-actuated clutches. The modulator spool uncovers an access at one of its ends through a certain flow passageway and its other end is borne against by a mechanical bias in the form of a spring. The spring biasing force against the modulator spool is made to increase proportionately to the increase of hydraulic pressure in the hydraulically-actuated clutch members. By virtue of such an arrangement, the full line pressure or, synonomously, the highest constant pressure in the hydraulic system, is made to more gradually act upon the hydraulic clutch elements so that the time required to actuate the hydraulic clutches is increased. Further, this modulating action takes place in such a manner that the modulator means becomes reset immediately after performing its function.

According to another aspect of the present invention, a spool-type valve control is provided with a hydraulic detent, analogous to a mechanical detent, whereby a spool will automatically remain in a selected position.

These aspects of the invention, along with others which will become apparent to those skilled in this art, are set forth below.

In the drawings:
FIG. 1 is a cross-sectional view of a control valve according to the present invention;
FIG. 2 is a view of one face of the valve of FIG. 1 showing one manifold surface;
FIG. 3 is a view of the valve shown in FIG. 1 showing the other manifold surface for various pressure fluid and exhaust conduits;
FIG. 4 is a cross-sectional view of a modulating valve according to this invention;
FIG. 5 is a view showing the manifold surface of the valve of FIG. 4;
FIG. 6 is a view taken along line 6—6 of FIG. 4; and
FIG. 7 shows the relationship between hydraulic pressure in certain hydraulic clutches which are adapted to be controlled by the valve of this invention, and time, for both modulated and unmodulated modes of operation.

Referring now to FIG. 1 of the drawings, the numeral 10 denotes generally the control section or portion of the modulated crawler control valve of this invention and includes a speed control spool 12 axially movable into a plurality of positions and adapted to be held in any one thereof by a mechanical detent arrangement denoted generally by the numeral 14. The spool 12 is provided with a plurality of lands and grooves therealong which cooperate with the illustrated recesses associated therewith to effect changes in the speed of the vehicle or other device which is to be controlled. The illustrated spool has four control positions designated 1, 2, 3, and 4 and a neutral position designated by the letter "N." The precise manner in which spool 12 effects such control is not illustrated nor will a detailed description thereof be set forth since it forms no significant portion of the present invention. The numerals 16 and 18 denote direction changing spools, identical in construction, and are adapted to assume one of three positions each, i.e., an axial position corresponding to "forward," "neutral," and "reverse" of the crawler or other hydraulically contolled mechanism. Because of the identical structure of spools 16 and 18, together with their mode of operation in the control device, a description of any one, that of 18, will be set forth here.

The numeral 20 denotes a plenum chamber intermediate two land portions 21 and 23 of spool 18 and is adapted to receive fluid pressure via manifold 20' illustrated in FIG. 2. The numeral 22 denotes a plenum adapted to be directly coupled to line pressure. The numeral 24 denotes an exhaust port communicating with exhaust plenum 26. The numerals 28 and 30 denote other land portions on spool 18 axially spaced as indicated. Numeral 32 denotes a fluid passageway connecting plenum chambers 34 and 36 while the numerals 38, 40 and 42 denote their structural counterparts near the other end of spool 18. Passages 32 and 38 are shown in plan in FIG. 2 and are diagrammatically illustrated in broken lines in FIG. 1. The numeral 46 denotes a centering spring encircling a shoulder screw 48 which is coupled to spool 18, the ends of spring 46 bearing against centering washers 50 and 52.

The numerals 60 and 62 denote plenum chambers which are coupled via ports 60' and 62' and suitable conduits (not shown) to forward and reverse clutches of, for example, a plural speed transmission. It will be recalled that engagement of a forward clutch causes the crawler or other device to move in one direction while engagement of a reverse clutch causes it to move in the opposite direction. For convenience, plenum chamber 60 may be thought of as the forward plenum while chamber 62 may be regarded as the reverse plenum. In the illustrated position of spool 18, neither chamber 60 nor chamber 62 is coupled to a source of pressure and hence in the illustrated position, the spool 18 is in neutral position. Note further that in the neutral position, plena 60 and 62 each communicate with exhaust chamber 26.

Before proceeding with further description of the invention, a description of the hydraulic detent feature of valve 10 will now be set out.

When spool 18 is moved in one direction to thus place either plenum chamber 60 or plenum chamber 62 in communication with chamber 20, and hence to either a forward or reverse clutch, such movement will hydraulically lock the spool in the same selected position. By way of illustration, assume spool 18 to be moved upwardly to thereby place forward plenum chamber 60 in communication with chamber 20. Such upward movement will cause land portion 30 to move up into plenum chamber 34, thus cutting off communication between exhaust passage 26 and plenum 34. Line pressure from chamber 22 now bears against the bottom annular portion of land 30 thus maintaining spool 28 in this position. To re-set spool 18 in the illustrated neutral position, it is only necessary to manually depress the spool to thereby overcome the hydraulic force against the bottom of land portion 30. Assume now that spool 18 had been moved downwardly, thus placing reverse plenum chamber 62 in communication with chamber 20 to thereby energize the reverse clutch. Land portion 28 moves into plenum chamber 42 and cuts off communication between exhaust passageway 26 and chamber 42. The line pressure in passage 22 now bears against the upper portion of land 28 thereby maintaining spool 18 in this position. Again, in order to re-set spool 18 to the illustrated neutral position, it is only necessary to overcome the hydraulic force on the top of spool 28 which may be done either manually or by other means. It is to be observed that re-positioning spool 18 in the illustrated position of FIG. 1 will allow any fluid pressure in either chamber 36 or chamber 40 to bleed through passageway 32 or 38, as the case may be, to thereby exhaust any pressure on either the bottom of land 30 on the top of land 28. Centering spring 46 holds the spool 18 in the illustrated neutral position in the absence of external forces. Again, it will be observed that the symmetry between spools 16 and 18 and the identical manner in which they are received by the block yields an identical mode of operation for spool 16. In this connection, it will further be observed that spools 16 and 18 may be operated simultaneously, either in the same or in opposite directions, and no matter what the mode of operation of these two spools is, the hydraulic detent feature above described will obtain for each.

Before proceeding with the detailed explanation of the modulator section of the valve of this invention, attention is directed to FIG. 7 of the drawings wherein one advantage enjoyed by the practice of this invention is illustrated. In FIG. 7, the clutch-actuating pressure is shown as the dependent variable plotted against time. Without the use of a pressure modulating or other shock absorbing device, a typical coupling of hydraulically-actuated clutches to line pressure from a lower or non-clutch actuated pressure is illustrated in the dotted path.

The zone denoted by the reference X illustrates the pressure during the period when the clutch actuating piston-cylinder units are being filled with pressure fluid. The point Y on the modulated curve indicates the time-pressure point when unmodulated line pressure is being directed to the clutch actuators.

The sharp rise in pressure with an unmodulated system often results in a pressure build-up twice as great as line pressure, as illustrated, in addition to the undesirable effects attendant hydraulic shocks in any type of hydraulically-actuated mechanism. FIG. 7 also illustrates the rather short length of time between the beginning of the change in pressure and the attainment of the final line pressure. In distinction to this rather rapid change, the full line or modulated path is shown as being more gradual and smoother. While this illustration is schematic in the sense that no precise time or pressure units have been set forth, it has been found that the use of the modulation feature shortly to be described results in an increase from 5 to 250 milliseconds in actuation time with a consequent softening of the effect of line pressure upon certain hydraulically-actuated clutches with certain line pressures, etc.

Turning now to FIGS. 4, 5 and 6 of the drawings, a description of the modulator section of the valve will now be given. The numeral 70 denotes generally the modulation section of the control valve of this invention and includes a block having a modulator spool 72 provided with land portions 74 and 76. The lower land 76 is provided with a plurality of axially extending apertures 78 and 80 extending from one face to the other and the numeral 82 denotes the lower end of spool 72. Portion 82, in the illustrated position, closes port 84 which leads from plenum chamber 83 to plenum chamber 86. The numerals 88 and 90 denote ends of a closed fluid passageway 89 which couples plenum chambers 86 and 92. The numeral 94 denotes a cup-shaped piston whose inner portion receives one end of spring 96, the other end of which bears against the top of land portion 74. The numeral 98 denotes an exhaust passageway having an exhaust port 100. The numeral 102 denotes a check valve, one side of which is coupled to plenum chamber 104 and the other side of which is coupled to the closed passageway 89 which couples ports 88 and 90. The direction of the check valve is such as to permit flow only from the passageway 89 to plenum chamber 104.

The numerals 110 and 112 denote structurally identical spools and, for convenience, only a description of spool 112 will be presented herein. The spool 112 is provided with axially spaced land portions 114 and 116. The diameter of land 116 is slightly smaller than the illustrated aperture in which it is partially positioned and thereby defines a cylindrical fluid passageway or port 117 denoted by a curved arrow. The numeral 118 denotes a plenum chamber and the numeral 120 denotes another plenum chamber. A passageway 122, shown in FIG. 5 and, diagrammatically, by broken lines in FIG. 4, connects plenum chambers 118 and 120. The passageway 122 is in fluid communication with plenum 20 of valve spool 18 via passage 20' illustrated in FIG. 2.

The numeral 124 denotes a plenum chamber adapted to receive full line pressure. The numeral 126 denotes a bore within spool 112, the bore communicating with the exterior surface of spool 112 through upper side aperture 128 and lower side aperture 130. The numerals 132 and 134 denote lower cavities in a block 135 coupled to the main block defining another portion of block 70 and the numeral 136 denotes a centering spring bearing against centering washers 138 and 140.

Before proceeding with a detailed description of the mode of operation of the modulating section 70 of the control valve, the following hydraulical connections between the blocks illustrated in FIGS. 1 and 4 will be set out. The blocks are suitably coupled together and hydraulic connections made between the valve block faces shown in FIGS. 2 and 5 such that plenum chamber 124 in modulating valve section 70 is in communication with full line pressure in chamber 22 of valve 10. Plenum 20 of FIG. 1 is coupled to plenum chambers 118 and 120 of FIG. 4 as described above. It will be remembered that plenum 60, when in communication with chamber 20, actuates the forward motion hydraulically-actuated clutch of the crawler type vehicle or other motion device in which the invention is employed while chamber 62, when coupled to chamber 20, actuates the reverse hydraulically-actuated clutch of the motion device. Line pressure is fed to the hydraulically-actuated clutches only through the modulator section of the valve, i.e., when the modulator is placed in parallel with the clutches. The line pressure in chamber 22 of FIG. 1 is not employed to actuate hydraulically-actuated clutches, rather for the hydraulic detent feature previously described in connection with FIG. 1.

Assume now it is desired to actuate the forward hydraulically-actuated clutch of a transmission such as disclosed in U.S. Patent No. 2,953,942, D. M. Schwartz et al., with which the present invention is used. For example, it may be desired on a two-track crawler type vehicle to engage the right track in the forward direction. Spool 18 is raised, placing chambers 20 and 60 in fluid communication. Here, it will be observed that reverse chamber 62 is coupled to exhaust. At the same time, line pressure from chamber 124 of FIG. 4 bleeds through passage 117 to chamber 120. If line pressure is of the order of 175 p.s.i., then initially the pressure in plenum chamber 120 will be approximately 35 p.s.i. This latter pressure in chamber 120 is also the pressure (through passageway 122) in chamber 118 and because chambers 118 and 120 are connected to chamber 20 of FIG. 1, this is also the initial pressure received in plenum chamber 60 and hence the initial pressure received by the hydraulically-actuated clutch. With continued bleeding through 117, the pressure in chamber 104 increases and thus urges modulator spool 72 upwardly, since it acts on the lower face of land portion 74. Continued movement of modulator spool 72 results in the eventual opening of exhaust chamber 98 to chamber 104 with the result that the fluid pressure in chamber 104 does not increase at an extremely rapid rate.

It is important to note that at this time the pressure in the hydraulically-actuated clutch is increasing. This follows from the fact that when the hydraulic clutch is initially opened to chamber 20 of FIG. 1, there is substantially no fluid pressure acting on the clutch but with the continued bleeding of line pressure from plenum 124 through 117, the pressure in the hydraulically-actuated clutch will build up.

With the upward motion of modulating spool 72, port 84 is uncovered by the end 82 of spool 72. This permits fluid pressure to pass from chamber 104, through passages 78 and 80, through port 84 and into port 88. Recalling that port 88 is coupled to port 90, the latter communicating with plenum chamber 92, it will be observed that the pressure now in chamber 86 at the lower end of FIG. 4 is now directed against the upper side of the movable piston 94. Through spring 96, this downward movement of piston 94 acts on the top portion of land 74, in direct opposition to the upward force exerted by the fluid in chamber 104 on the lower portion of land 74.

It will be observed that the otherwise extremely rapid build-up of pressure in the hydraulically-actuated clutch is slowed down by the leakage of this same pressure from chamber 104 of FIG. 4 to exhaust chamber 98. This latter action, in turn, is held to a carefully controlled rate by the opposite effect of the downward force of piston 94 which precludes the rapid and complete upward movement of spool 72. By adjusting the force in spring 96 and the size of port 84, for example, the quantity of hydraulic fluid passing from chamber 104 to exhaust chamber 98 may be set to any desired degree to thereby control the rate of pressure increase as illustrated at FIG. 7 of the drawings.

Concurrently with the motion of modulating spool 72 and the build-up of pressure in the hydraulically-actuated clutch elements, fluid pressure which has been bleeding through 117 to produce the above described effect, has also been passing through ports 128 to port 130 to cavities 132 and 134. The size of ports 128 and 130 and the nature of centering spring 136 are such that when the pressure in the hydraulically-actuated clutch has reached approximately 100 p.s.i., assuming the line pressure to be 175 p.s.i., the pressure in cavities 132 and 134 is sufficient to push lockup spool 112 upwardly against the force of centering spring 136 to such an extent that land portion 142 of spool 112 cuts off communication between chambers 104 and 120 and allows chamber 104 to be placed in fluid communication with exhaust chamber 98 through the groove portion 144 between land portions 142 and 146. Chambers 118 and 120, however, are not isolated from the line pressure input chamber 124 so that pressure, now full line pressure, is still being applied to the hydraulically-actuated clutch and continues to be so applied until the spool 112 is pushed downwardly, as will later be described.

With spool 112 in the uppermost position and being held there by hydraulic pressure on the lower face of land 146, because fluid pressure in plenum 104 is led to exhaust, any fluid in chambers 92 and 86 will pass through check valve 102 into chamber 104 and thence to exhaust. This will permit bias spring 96 to return piston 94 to the illustrated position and modulator spool 72 will also return to the illustrated position. Thus, the modular spool, in a very short time, is ready for the next modulating cycle whenever required.

Fluid pressure acting against the lower portion of land 146 will maintain lockup spool 112 in this position until it is manually depressed as described hereinbelow or until the clutch selector valve is moved to a new clutch engage position. When a new clutch engage position is selected pressure fluid from chambers 118 and 120 flows to the clutch piston-cylinder space releasing the pressure on the lower face of land 146 whereby the spring 136 moves the spool to the illustrated spring centered position. If spool 112 is now manually forced downwardly, past the illustrated position, chamber 118 is placed in communication with exhaust passage 98. This exhausts the pressure in chambers 118 and 120 hence exhausts pressure from chamber 20 of FIG. 1 and from the clutch which is engaged. Thus, depression of spool 112 below the illustrated position results in the exhaustion of pressure from the hydraulic clutch.

Assuming the use of the present invention on a crawler type tractor, spool 112 in combination with its cooperating clutch selecting spool 18 exhibits a desirable memory feature in that depression of spool 112 by the vehicle operator, which spool 18 is in a clutch engaged position will result in the disengagement of, say, the right hand track of the vehicle where it is desired to make a braked turn. After the turn is completed, release of the manual force holding spool 112 downwardly allows the centering spring 136 to place spool 112 in the illustrated position, so that the right hand track of the crawler type vehicle will once again be engaged in, say, the forward direction. Thus, if the vehicle was moving in a forward direction and a braked right turn was made by stopping the right track, re-engagement of spool 112 will automatically effect a re-engagement of this track in the same direction it was going.

While the description has treated spool 112, it will be recalled that spool 110 is structurally identical to spool 112 as well as its mode of cooperation with the block which constitutes the modulator portion of the control valve of this invention. It will be observed that the modulator spool 72 with its associated elements is in parallel with both spools 110 and 112 and thus the same modulator means is in operation when spools 110 and 112 are simultaneously operated to thereby assure an even action which might not be possible with a separate modulation means for each set of clutches.

From the foregoing description, those skilled in this art will be enabled to practice the invention. While there has been shown and described an embodiment of the invention, various changes and modifications may be made without departing from the spirit and scope of the invention as defined in the appended claims.

I claim:

1. In a hydraulic flow control system a valve block, a first flow control spool slidably mounted in said block, a pressure fluid outlet groove and a pressure fluid inlet groove in said block, a first land on said first control spool normally blocking the flow of pressure fluid from the inlet groove to the outlet groove, a second land on said first spool permitting restricted flow of pressure fluid from the inlet groove to the outlet groove, a second flow control spool slidably mounted in said block, passage means in said block connecting the bleed pressure fluid from about said second land on the first spool to a control land on the second spool, an exhaust groove normally blocked by the control land on the second spool and connectable to the passage means in said block by the force of the bleed pressure fluid from about the second land on the first control spool, a pressure fluid actuator for each of said flow control spools, each of said pressure fluid actuators having connection to said bleed pressure fluid and adapted to position the first land on the first spool to permit the flow of pressure fluid from the inlet groove to the outlet groove and to position the second spool in said normal position when the bleed pressure fluid approaches the pressure of the pressure fluid in the inlet groove of the first spool.

2. In a hydraulic control device, a block, a spool slidably mounted within said block, a first passageway adapted to receive fluid pressure, two axially spaced land portions on said spool passing through portions of said first passageway, a plenum chamber in fluid communication with each face of each of said land portions when said spool is in a neutral position, a closed fluid passage connecting the said plenum chambers associated with each of said land portions, an exhaust passageway communicating with the innermost pair of said plenum chambers in said neutral position of said spool, the axially outermost faces of each of said lands being nearer said first passageway than the axially innermost faces of said lands, whereby movement of either of said outermost land faces into the first passageway will hydraulically lock the spool in the position of movement of the spool.

3. The device of claim 2 wherein said spool is mechanically biased into a neutral position.

4. In a hydraulic control device, a hydraulic modulator including a block having a modulator spool slidable therein, said modulator spool including a land portion, a first plenum chamber located at a first end of said spool, a second plenum chamber in fluid communication with a first side of said land portion, a third plenum chamber, said land portion of said spool in the neutral position of the said spool precluding fluid communication between said second and third plenum chambers, a fourth plenum chamber located at the second end of said modulator spool, a closed fluid path between said first and fourth plenum chambers, fluid pressure in said second plenum chamber acting against said first face of said land and to thereby establish fluid communication between said second and third plenum chambers, motion of said modulating spool in the direction of fluid pressure acting against the first face of said land uncovering said port into said first plenum chamber to thereby establish fluid communication between said first and second plenum chambers, means in said fourth plenum chamber to act against the second face of said land in opposition to pressure acting on said first face of said land, whereby a source of pressure fed into said second plenum chamber will increase in accordance with the fluid flow from the second to the third plenum chambers as the spool moves under the net resultant of two oppositely acting forces.

5. The device of claim 4 wherein the means in said fourth plenum chamber comprises a piston resiliently coupled to the said spool and in fluid communication with fluid pressure transmitted from said first to said fourth plenum chambers.

6. The device of claim 4 including a further spool slidably received within said block and having a neutral position with respect to said block, a fifth plenum chamber serving as a line input pressure chamber, a sixth plenum chamber in said block, axially spaced land portions on said further spool, a seventh plenum chamber in said block, a fluid passageway coupling said sixth and seventh plenum chambers, means defining a bleed passage between said fifth and sixth plenum chambers, said second and sixth plenum chambers being in fluid communication in the said neutral position of said further spool, whereby fluid pressure introduced into said fifth plenum chamber will bleed into said sixth plenum chamber and thence into said second plenum chamber to initiate the modulating action of said modulating spool.

7. The device of claim 6 including means biasing said further spool to said neutral position.

8. The device of claim 6 wherein said further spool includes a fluid passageway connecting said sixth plenum chamber in communication with an eighth plenum chamber, said eighth plenum chamber being situated such that fluid pressure is said eighth plenum chamber will urge said further spool to a position establishing fluid communication between said second and third plenum chambers through a groove on said further spool, whereby after the said modulating action of the modulating spool is completed, fluid pressure in the second plenum chamber will be exhausted to the third plenum chamber and thereby allow the modulating spool to return to a neutral position.

9. In a hydraulic system, the combination of a modulating spool normally biased to assume a neutral position, a first control spool having a normal position which bleeds a lower pressure from a higher pressure to said modulating spool, a second control spool including hydraulic holding means to maintain said second spool with respect to its housing in an actuated position, a hydraulic clutch, means coupling said hydraulic clutch with the said bleed pressure fluid of said first spool to thereby place the said hydraulic clutch in parallel with said modulating spool to effect a smooth pressure transition in the clutch.

10. In a hydraulic control system, the combination of a modulating spool within a housing and normally biased to assume a neutral position, a first control spool having a neutral position, a fluid passageway adjacent said first spool adapted to be connected to a line pressure, said first spool having means to bleed line pressure into a lower pressure and thence in fluid communication with said modulator spool to urge said modulator spool in a direction opposite its bias, said modulator spool including means to increase said bias when pressure is bled from said first spool to said modulator spool to thereby control the rate of pressure increase of said bled pressure.

11. In a hydraulic control system, a pressure modulating control including a pressure modulating spool slidable within a housing, said spool being mechanically biased to assume a neutral position, a further spool having a neutral position with respect to a housing, means for bleeding a line pressure to a lower pressure, a fluid path in the neutral positions of said modulating and further spools coupling the said bleed means with the said modulating spool, a fluid path between said bleed means and a land face carried by said further spool, movement of said modulating spool in a direction against the mechanical biasing means establishing a fluid path between said bleed means and said mechanical biasing means to thereby increase said mechanical biasing means and increase the pressure of the bled pressure fluid, whereby the further spool will be moved by said increased bled pressure fluid acting against the land carried by the spool to thereby automatically stop the operation of the bleed means and thereby allow the modulating spool to reassume its neutral position.

References Cited by the Examiner

UNITED STATES PATENTS

| | | | |
|---|---|---|---|
| 2,630,828 | 3/1953 | Bent | 137—596 X |
| 2,755,624 | 7/1956 | Klessie et al. | 137—115 X |
| 2,757,641 | 8/1956 | Meddock | 137—115 X |
| 2,835,266 | 5/1958 | Morte | 137—115 X |
| 3,099,289 | 7/1963 | Neilson et al. | 137—596 |

M. CARY NELSON, *Primary Examiner.*

H. KLINKSIEK, *Assistant Examiner.*